(12) United States Patent
Hilken et al.

(10) Patent No.: US 10,907,007 B2
(45) Date of Patent: Feb. 2, 2021

(54) POLYURETHANE FOAMS BASED ON POLYETHERCARBONATE POLYOLS

(71) Applicant: Covestro Intellectual Property GmbH & Co. KG, Leverkusen (DE)

(72) Inventors: Persefoni Hilken, Leverkusen (DE); Stefan Lindner, Remscheid (DE); Michael Schedler, Leverkusen (DE); Hartmut Nefzger, Pulheim (DE); Michael Baecker, Korschenbroich (DE)

(73) Assignee: Covestro Intellectual Property GMBH & Co. KG, Leverkusen (DE)

( * ) Notice: Subject to any disclaimer, the term of this patent is extended or adjusted under 35 U.S.C. 154(b) by 0 days.

(21) Appl. No.: 16/975,769

(22) PCT Filed: Mar. 4, 2019

(86) PCT No.: PCT/EP2019/055243
§ 371 (c)(1),
(2) Date: Aug. 26, 2020

(87) PCT Pub. No.: WO2019/170568
PCT Pub. Date: Sep. 12, 2019

(65) Prior Publication Data
US 2020/0407485 A1    Dec. 31, 2020

(30) Foreign Application Priority Data
Mar. 7, 2018  (EP) .................................. 18160392

(51) Int. Cl.
| C08G 18/76 | (2006.01) |
| C08G 18/44 | (2006.01) |
| C08G 18/42 | (2006.01) |
| C08J 9/12  | (2006.01) |

(52) U.S. Cl.
CPC ..... *C08G 18/7614* (2013.01); *C08G 18/4202* (2013.01); *C08G 18/4238* (2013.01); *C08G 18/44* (2013.01); *C08J 9/125* (2013.01); *C08J 2375/08* (2013.01)

(58) Field of Classification Search
CPC ............ C08G 18/4202; C08G 18/4238; C08G 18/44; C08G 18/7614; C08J 9/125; C08J 2375/08
See application file for complete search history.

(56) References Cited

U.S. PATENT DOCUMENTS

| 3,404,109 A | 10/1968 | Milgrom |
| 3,829,505 A | 8/1974 | Herold |
| 3,941,849 A | 3/1976 | Herold |
| 4,089,835 A | 5/1978 | Konig et al. |
| 4,248,930 A | 2/1981 | Haas et al. |
| 4,260,530 A | 4/1981 | Reischl et al. |
| 4,263,408 A | 4/1981 | Meyborg et al. |
| 4,374,209 A | 2/1983 | Rowlands |
| 4,644,017 A | 2/1987 | Haas et al. |
| 4,826,887 A | 5/1989 | Kuyper et al. |
| 4,826,952 A | 5/1989 | Kuyper et al. |
| 4,826,953 A | 5/1989 | Kuyper et al. |
| 5,158,922 A | 10/1992 | Hinney et al. |
| 5,470,813 A | 11/1995 | Le-Khac |
| 5,482,908 A | 1/1996 | Le-Khac |
| 5,536,883 A | 7/1996 | Le-Khac |
| 5,545,601 A | 8/1996 | Le-Khac |
| 5,627,120 A | 5/1997 | Le-Khac |
| 5,637,673 A | 6/1997 | Le-Khac |
| 5,712,216 A | 1/1998 | Le-Khac et al. |
| 5,789,626 A | 8/1998 | Le-Khac |
| 6,018,017 A | 1/2000 | Le-Khac |
| 6,767,986 B2 | 7/2004 | Moethrath et al. |
| 7,008,900 B1 | 3/2006 | Hofmann et al. |
| 7,977,501 B2 | 7/2011 | Haider et al. |
| 8,134,022 B2 | 3/2012 | Haider et al. |
| 8,324,419 B2 | 12/2012 | Mijolovic et al. |
| 2014/0066535 A1 | 3/2014 | Jacobs et al. |
| 2014/0107245 A1* | 4/2014 | Hofmann ............ C08G 64/183 521/172 |
| 2014/0329985 A1* | 11/2014 | Lorenz ................ C11C 3/00 528/74.5 |
| 2015/0259496 A1* | 9/2015 | Albers ............... C08G 18/4018 521/131 |
| 2016/0257776 A1 | 9/2016 | Jacobs et al. |
| 2018/0273674 A1 | 9/2018 | Klesczewski et al. |

FOREIGN PATENT DOCUMENTS

| DE | 3103757 A1 | 12/1981 |
| EP | 0355000 A1 | 2/1990 |
| GB | 2072204 A | 9/1981 |
| WO | WO 2017097729 A1 | 6/2017 |

OTHER PUBLICATIONS

International Search Report, PCT/EP2019/055243, dated May 13, 2019, Authorized officer: Martin Bergmeier.

(Continued)

*Primary Examiner* — John M Cooney
(74) *Attorney, Agent, or Firm* — Donald R. Palladino; Jed C. Benson

(57) ABSTRACT

The invention relates to a method for producing polyurethane foams by reacting the following components A a polyol component containing A1 40 to 100 parts by weight of polyether carbonate polyol with a hydroxyl number according to DIN 53240-1 June 2013 of 20 mg KOH/g to 120 mg KOH/g, A2 0 to 60 parts by weight of polyether polyol with a hydroxyl number according to DIN 53240-1 June 2013 of 20 mg KOH/g to 250 mg KOH/g and an ethylene oxide content of 0 to 60 wt. %, wherein polyether polyol A2 is free from carbonate units, B B1 a catalyst and B2 optionally auxiliary and additional materials, C water and/or physical blowing agents with D di- and/or polyisocyanates, wherein the production occurs at a characteristic value of 90 to 120, characterised in that the component A contains a component A5 of 0.05 to 10.00 parts by weight of polyester polyol, in relation to the sum of the parts by weight of the components A1+A2=100 parts by weight, said polyester polyol containing units derived from malonic acid.

14 Claims, No Drawings

(56) References Cited

OTHER PUBLICATIONS

Inoue et al., Copolymerization of Carbon Dioxide and Epoxide with Organometallic Compounds; Die Makromolekulare Chemie 130, 210-220, 1969.
W. Siefken in Justus Liebigs Annalen der Chemie, 562, pp. 75-136.

\* cited by examiner

POLYURETHANE FOAMS BASED ON POLYETHERCARBONATE POLYOLS

CROSS-REFERENCE TO RELATED APPLICATION

This application is a national stage application under 35 U.S.C. § 371 of PCT/EP2019/055243, filed Mar. 4, 2019, which claims the benefit of European Application No. 18160392, filed Mar. 7, 2018, each of which is incorporated herein by reference.

FIELD

The present invention relates to a process for producing polyurethane foams, preferably flexible polyurethane foams, by reaction of an isocyanate component with a component which is reactive toward isocyanates and comprises at least one polyether carbonate polyol, with the reaction taking place in the presence of a component A5 which will be described in more detail below. The invention further relates to polyurethane foams produced by the process according to the invention and to the use thereof.

BACKGROUND

In the context of an environmentally friendly configuration of production processes, it is generally desirable to use $CO_2$-based starting materials, for example in the form of polyether carbonate polyols, in relatively large amounts. The preparation of polyether carbonate polyols by catalytic reaction of alkylene oxides (epoxides) and carbon dioxide in the presence of H-functional starter compounds ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown schematically in the scheme (I), where R is an organic radical such as alkyl, alkylaryl or aryl, which in each case can also contain heteroatoms such as O, S, Si, etc., and e, f and g are each an integer; the polyether carbonate polyol product shown here in scheme (I) should be interpreted merely as meaning that blocks having the structure shown can in principle recur in the polyether carbonate polyol obtained, with the order, number and length of the blocks and also the OH functionality of this starter being able to vary and not being restricted to the polyether carbonate polyol shown in scheme (I). This reaction (see scheme (I)) is ecologically very advantageous since this reaction represents the reaction of a greenhouse gas such as $CO_2$ into a polymer. A further product formed, actually a by-product, is the cyclic carbonate shown in scheme (I) (for example propylene carbonate when $R=CH_3$, also referred to hereinafter as cPC, or ethylene carbonate when $R=H$, also referred to hereinafter as cEC).

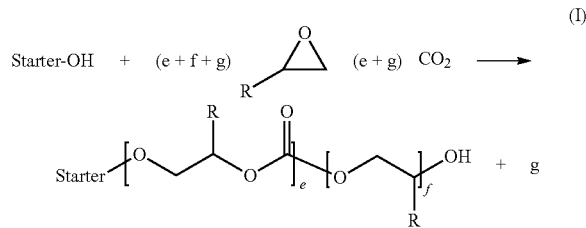

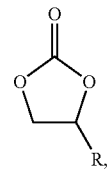

The production of polyurethane foams based on polyether carbonate polyols and isocyanates is known (e.g. WO 2012/130760 A1, EP-A 0 222 453). It has been found that when polyether carbonate polyols are used for producing polyurethane foams, the resulting products contain cyclic propylene carbonate which can be detected, for example, by emission measurements on the flexible polyurethane foam.

WO 2017/097729 A1 states that a reduction in the emission of cyclic propylene carbonate can be observed when esters of monobasic or polybasic carboxylic acids whose (first) dissociation has a pKa of from 0.5 to 4.0 are used as additives in the foaming of polyurethane foams.

SUMMARY

It is an object of the present invention to provide a process for producing polyurethane foams which leads to polyurethane foams having a reduced emission of cyclic propylene carbonate.

This object has surprisingly been achieved by a process for producing polyurethane foams by reaction of the components A polyol component containing
    A1 from 40 to 100 parts by weight of polyether carbonate polyol having a hydroxyl number in accordance with DIN 53240-1 of June 2013 of from 20 mg KOH/g to 120 mg KOH/g,
    A2 from 0 to 60 parts by weight polyether polyol having a hydroxyl number in accordance with DIN 53240-1 of June 2013 of from 20 mg KOH/g to 250 mg KOH/g and a content of ethylene oxide of from 0 to 60% by weight, where polyether polyol A2 is free of carbonate units, B
    B1 catalyst and
    B2 optionally auxiliaries and additives C water and/or physical blowing agents,
with
D diisocyanates and/or polyisocyanates,
where the production is carried out at an index of from 90 to 120, characterized in that the component A contains a component
A5 from 0.05 to 10.00 parts by weight, based on the sum of the parts by weight of the components A1+A2=100 parts by weight, of polyester polyol containing structural units derived from malonic acid.

DETAILED DESCRIPTION

The invention preferably provides a process for producing polyurethane foams, preferably flexible polyurethane foams, by reaction of
    A1 from 40 to 100 parts by weight, preferably from 60 to 100 parts by weight, particularly preferably from 80 to 100 parts by weight, of one or more polyether carbonate polyols having a hydroxyl number in accordance with DIN 53240-1 of June 2013 of from 20 mg KOH/g to 120 mg KOH/g, A2 from 0 to 60 parts by weight, preferably from 0 to 40 parts by weight, particularly preferably from 0 to 20 parts by weight, of one or more polyether polyols having a hydroxyl number in accordance with DIN 53240-1 of June 2013 of from 20 mg KOH/g to 250 mg KOH/g and a content of ethylene oxide of from 0 to 60% by weight, where the polyether polyols A2 are free of carbonate units, A3 from 0 to 20 parts by weight, based on the sum of the parts by weight of the components A1 and A2, of one or more polyether polyol having a hydroxyl number in accordance with DIN 53240-1 of June 2013 of from 20 mg KOH/g to 250 mg KOH/g and a content of ethylene oxide of >60% by weight, where the polyether polyols A3 are free of carbonate units, A4 from 0 to 40 parts by weight, based on the sum of the parts by weight of the components A1 and A2, of one or more polymer polyols, PUD polyols and/or PIPA polyols, A6 from 0 to 40 parts by weight, based on the sum of the parts by weight of the components A1 and A2, of polyols which do not come under the definition of the components A1 to A5.

B
  B1 catalysts, and
  B2 optionally auxiliaries and additives
C water and/or physical blowing agents,
with
D diisocyanates and/or polyisocyanates,
where the production is carried out at an index of from 90 to 120, and
where the figures for the parts by weight of the components A3, A4 and A6 are in each case based on the sum of the parts by weight of A1+A2=100 parts by weight, characterized in that the component A contains a component A5 from 0.05 to 10.00 parts by weight, based on the sum of the parts by weight of the components A1+A2=100 parts by weight, of polyester polyol containing structural units derived from malonic acid.

The components A1 to A6 in each case relate to "one or more" of the compounds mentioned. When a plurality of compounds of one component are used, the amount indicated corresponds to the sum of the parts by weight of the compounds.

In a particularly preferred embodiment, component A contains

A1 from 65 to 75 parts by weight, most preferably from 68 to 72 parts by weight of one or more polyether carbonatepolyols having a hydroxyl number according to DIN 53240-1 of June 2013 of from 20 mg KOH/g to 120 mg KOH/g and preferably a $CO_2$ content of from 15 to 25% by weight, and A2 from 25 to 35 parts by weight, most preferably from 28 to 32 parts by weight, of one or more polyether polyols having a hydroxyl number in accordance with DIN 53240-1 of June 2013 of from 20 mg KOH/g to 250 mg KOH/g and a content of ethylene oxide of from 0 to 60% by weight, where the polyether polyols A2 are free of carbonate units, where the component A is preferably free of components A3 and/or A4.

In another embodiment, component A comprises

A1 from 65 to 75 parts by weight, preferably from 68 to 72 parts by weight, of one or more polyether carbonate polyols having a hydroxyl number in accordance with DIN 53240-1 of June 2013 of from 20 mg KOH/g to 120 mg KOH/g and preferably a $CO_2$ content of from 15 to 25% by weight, and A2 from 25 to 35 parts by weight, preferably from 28 to 32 parts by weight, of one or more polyether polyols having a hydroxyl number in accordance with DIN 53240-1 of June 2013 of from 20 mg KOH/g to 250 mg KOH/g and a content of ethylene oxide of from 0 to 60% by weight, where the polyether polyols A2 are free of carbonate units, A3 from 2 to 20 parts by weight, preferably from 2 to 10 parts by weight, based on the sum of the parts by weight of the components A1 and A2, of one or more polyether polyols having a hydroxyl number in accordance with DIN 53240-1 of June 2013 of from 20 mg KOH/g to 250 mg KOH/g and a content of ethylene oxide of >60% by weight, where the polyether polyols A3 are free of carbonate units, where the component A is preferably free of component A4.

In a further embodiment, component A comprises

A1 from 40 to 100 parts by weight, preferably from 60 to 100 parts by weight, particularly preferably from 80 to 100 parts by weight, most preferably from 65 to 75 parts by weight, of one or more polyether carbonate polyols having a hydroxyl number in accordance with DIN 53240-1 of June 2013 of from 20 mg KOH/g to 120 mg KOH/g and preferably a $CO_2$ content of from 15 to 25% by weight, and A2 from 0 to 60 parts by weight, preferably from 0 to 40 parts by weight, particularly preferably from 0 to 20 parts by weight, most preferably from 25 to 35 parts by weight, of one or more polyether polyols having a hydroxyl number in accordance with DIN 53240-1 of June 2013 of from 20 mg KOH/g to 250 mg KOH/g and a content of ethylene oxide of from 0 to 60% by weight, where the polyether polyols A2 are free of carbonate units, A4 from 0.01 to 40.00 parts by weight, preferably from 0.01 to 20.00 parts by weight, particularly preferably from 1.00 to 20.00 parts by weight, most preferably from 2.00 to 20.00 parts by weight, based on the sum of the parts by weight of the components A1 and A2, of one or more polymer polyols, PUD polyols and/or PIPA polyols, A6 from 0 to 40 parts by weight, based on the sum of the parts by weight of the components A1 and A2, of polyols which do not come under the definition of the components A1 to A5, where the component A is preferably free of component A3.

Here, the stated ranges and ranges of preference of components A1, A2, A4 and A6 are freely combined with one another.

In the following, the components used in the process of the invention are described in more detail.

Component A1

The component A1 comprises a polyether carbonate polyol which has a hydroxyl number (OH number) in accordance with DIN 53240-1 (June 2013) of from 20 mg KOH/g to 120 mg KOH/g, preferably from 20 mg KOH/g to 100 mg KOH/g, particularly preferably from 25 mg KOH/g to 90 mg KOH/g, and is obtained by copolymerization of carbon dioxide and one or more alkylene oxides in the presence of one or more H-functional starter molecules, where the polyether carbonate polyol preferably has a $CO_2$ content of from 15 to 25% by weight. Component A1 preferably comprises a polyether carbonate polyol which is obtainable by copolymerization of from 2% by weight to 30% by weight of carbon dioxide and from 70% by weight to 98% by weight of one or more alkylene oxides in the presence of one or more H-functional starter molecules having an average functionality of from 1 to 6, preferably from 1 to 4, particularly preferably from 2 to 3. For the purposes of the invention, the expression "H-functional" refers to a starter compound which has H atoms which are reactive in respect of alkoxylation.

The copolymerization of carbon dioxide and one or more alkylene oxides is preferably effected in the presence of at least one DMC catalyst (double metal cyanide catalyst).

The polyether carbonate polyols used in accordance with the invention preferably also have ether groups between the carbonate groups, shown schematically in formula (II). In the scheme according to formula (II), R is an organic radical such as alkyl, alkylaryl or aryl which can in each case also contain heteroatoms such as O, S, Si, etc.; e and f are each an integer. The polyether carbonate polyol shown in the scheme according to formula (II) should be considered to mean merely that blocks having the structure shown can in principle be present in the polyether carbonate polyol but the order, number and length of the blocks can vary and are not restricted to the polyether carbonate polyol shown in formula (II). In the case of formula (II), this means that the ratio of e/f is preferably from 2:1 to 1:20, particularly preferably from 1.5:1 to 1:10.

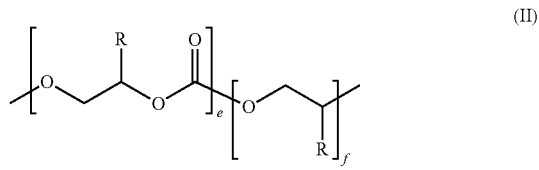
(II)

The proportion of incorporated $CO_2$ ("units derived from carbon dioxide"; "$CO_2$ content") in a polyether carbonate polyol can be determined from the evaluation of characteristic signals in the $^1$H NMR spectrum. The following example illustrates the determination of the proportion of units derived from carbon dioxide in a 1,8-octanediol-initiated $CO_2$/propylene oxide polyether carbonate polyol.

The proportion of incorporated $CO_2$ in a polyether carbonate polyol and the ratio of propylene carbonate to polyether carbonate polyol can be determined by means of $^1$H NMR (a suitable instrument is the DPX 400 instrument from Bruker, 400 MHz; pulse program zg30, delay time d1: 10 s, 64 scans). Each sample is dissolved in deuterated chloroform. The relevant resonances in the $^1$H NMR (based on TMS=0 ppm) are as follows:

Cyclic carbonate (which was formed as a by-product) having a resonance at 4.5 ppm; carbonate resulting from carbon dioxide incorporated in the polyether carbonate polyol having resonances at 5.1 to 4.8 ppm; unreacted propylene oxide (PO) having a resonance at 2.4 ppm; polyether polyol (i.e. without incorporated carbon dioxide) having resonances at 1.2 to 1.0 ppm; the octane-1,8-diol incorporated as starter molecule (if present) having a resonance at 1.6 to 1.52 ppm.

The proportion by weight (in % by weight) of polymer-bonded carbonate (LC) in the reaction mixture was calculated according to formula (III), $$LC' = \frac{[F(5.1-4.8) - F(4.5)] * 102}{N} * 100\% \quad \text{(III)}$$

where the value of N ("denominator" N) is calculated according to formula (IV):

$$N=[F(5.1-4.8)-F(4.5)]*102+F(4.5)*102+F(2.4)*58+ \\ 0.33*F(1.2-1.0)*58+0.25*F(1.6-1.52)*146 \quad \text{(IV)}$$

The following abbreviations apply here:
F(4.5)=area of the resonance at 4.5 ppm for cyclic carbonate (corresponds to one H atom)
F(5.1-4.8)=area of the resonance at 5.1-4.8 ppm for polyether carbonate polyol and one H atom for cyclic carbonate.
F(2.4)=area of the resonance at 2.4 ppm for free, unreacted PO
F(1.2-1.0)=area of the resonance at 1.2-1.0 ppm for polyether polyol
F(1.6-1.52)=area of the resonance at from 1.6 to 1.52 ppm for 1,8-octanediol (starter), if present.

The factor of 102 results from the sum of the molar masses of $CO_2$ (molar mass 44 g/mol) and of propylene oxide (molar mass 58 g/mol), the factor of 58 results from the molar mass of propylene oxide, and the factor of 146 results from the molar mass of the octane-1,8-diol starter used (if present).

The proportion by weight (in % by weight) of cyclic carbonate (CC) in the reaction mixture was calculated according to formula (V), $$CC' = \frac{F(4.5)*102}{N} * 100\% \quad \text{(V)}$$

where the value of N is calculated according to formula (IV).

In order to calculate the composition based on the polymer component (consisting of polyether polyol built up from starter and propylene oxide during the activation steps taking place under $CO_2$-free conditions, and polyether carbonate polyol built up from starter, propylene oxide and carbon dioxide during the activation steps taking place in the presence of $CO_2$ and during the copolymerization) from the values for the composition, the nonpolymeric constituents of the reaction mixture (i.e. cyclic propylene carbonate and any unreacted propylene oxide present) were eliminated mathematically. The proportion by weight of the carbonate repeating units in the polyether carbonate polyol was converted into a proportion by weight of carbon dioxide by means of the factor F=44/(44+58). The indicated $CO_2$ content in the polyether carbonate polyol is normalized relative to the proportion of the polyether carbonate polyol molecule formed in the copolymerization and any activation steps in the presence of $CO_2$ (i.e. the proportion of the polyether carbonate polyol molecule resulting from the starter (1,8-octanediol, if present) and from the reaction of the starter with epoxide added under $CO_2$-free conditions was disregarded here).

For example, the preparation of polyether carbonate polyols according to A1 comprises:
(α) an H-functional starter compound or a mixture of at least two H-functional starter compounds is initially charged and water and/or other volatile compounds are optionally removed by means of elevated temperature and/or reduced pressure ("drying"), with the DMC catalyst being added to the H-functional starter compound or the mixture of at least two H-functional starter compounds before or after drying,
(β) a partial amount (based on the total amount of the amount of alkylene oxides used in the activation and copolymerization) of one or more alkylene oxides is added to the mixture resulting from step (α) to effect the activation, with this addition of a partial amount of alkylene oxide optionally being able to be carried out in the presence of $CO_2$ and the hot spots occurring as a result of the subsequent exothermic chemical reaction and/or a pressure drop in the reactor then being awaited and the activation step (β) also being able to be carried out a number of times, (γ) one or more of the alkylene oxides and carbon dioxide are added to the mixture resulting from step (β), with the alkylene oxides used in step (β) being able to be identical to or different from the alkylene oxides used in step (γ).

In general, alkylene oxides (epoxides) having 2 to 24 carbon atoms can be used for preparing the polyether carbonate polyols A1. The alkylene oxides having from 2 to 24 carbon atoms are for example one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, monoepoxidized or polyepoxidized fats as monoglycerides, diglycerides and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxyfunctional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyl-triisopropoxysilane. Preference is given to using ethylene oxide and/or propylene oxide and/or 1,2-butylene oxide, particularly preferably propylene oxide, as alkylene oxides.

In a preferred embodiment of the invention, the proportion of ethylene oxide in the total amount of propylene oxide and ethylene oxide used is from 0 to 90% by weight, preferably from 0 to 50% by weight, and is particularly preferably free of ethylene oxide.

As suitable H-functional starter compounds, it is possible to use compounds having H atoms which are active in respect of alkoxylation. Groups having active H atoms which are active in respect of the alkoxylation are, for example, —OH, —NH₂ (primary amines), —NH— (secondary amines), —SH, and —CO₂H, with preference being given to —OH and —NH₂, and particular preference being given to —OH. As H-functional starter compounds, use is made of, for example, one or more compounds selected from the group consisting of water, mono- or polyhydric alcohols, polyfunctional amines, polyhydric thiols, amino alcohols, thiol alcohols, hydroxy esters, polyether polyols, polyester polyols, polyester ether polyols, polyether carbonate polyols, polycarbonate polyols, polycarbonates, polyethyleneimines, polyetheramines (e.g. Jeffamines® from Huntsman, e.g. D-230, D-400, D 2000, T-403, T-3000, T-5000, or corresponding products from BASF, e.g. polyetheramine D230, D400, D200, T403, T5000), polytetrahydrofurans (e.g. PolyTHF® from BASF, e.g. PolyTHF® 250, 650S, 1000, 10005, 1400, 1800, 2000), polytetrahydrofuranamines (BASF product polytetrahydrofuranamine 1700), polyether thiols, polyacrylate polyols, castor oil, the monoglyceride or diglyceride of ricinoleic acid, monoglycerides of fatty acids, chemically modified monoglycerides, diglycerides and/or triglycerides of fatty acids, and $C_1$-$C_{24}$-alkyl fatty acid esters containing an average of at least 2 OH groups per molecule. By way of example, the $C_1$-$C_{24}$-alkyl fatty acid esters containing an average of at least 2 OH groups per molecule are commercial products such as Lupranol Balance® (from BASF AG), Merginol® products (from Hobum Oleochemicals GmbH), Sovermol® products (from Cognis Deutschland GmbH & Co. KG) and Soyol®TM products (from USSC Co.).

As monofunctional starter compounds, it is possible to use alcohols, amines, thiols and carboxylic acids. As monofunctional alcohols, it is possible to use: methanol, ethanol, 1-propanol, 2-propanol, 1-butanol, 2-butanol, t-butanol, 3-buten-1-ol, 3-butyn-1-ol, 2-methyl-3-buten-2-ol, 2-methyl-3-butyn-2-ol, propargyl alcohol, 2-methyl-2-propanol, 1-t-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Possible monofunctional amines are: butylamine, t-butylamine, pentylamine, hexylamine, aniline, aziridine, pyrrolidine, piperidine, morpholine. As monofunctional thiols, it is possible to use: ethanethiol, 1-propanethiol, 2-propanethiol, 1-butanethiol, 3-methyl-1-butanethiol, 2-butene-1-thiol, thiophenol. As monofunctional carboxylic acids, mention may be made of: formic acid, acetic acid, propionic acid, butyric acid, fatty acids such as stearic acid, palmitic acid, oleic acid, linoleic acid, linolenic acid, benzoic acid, acrylic acid.

Polyhydric alcohols which are suitable as H-functional starter compounds are, for example, dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentantanediol, methylpentanediols (such as, for example, 3-methyl-1,5-pentanediol), 1,6-hexanediol; 1,8-octanediol, 1,10-decanediol, 1,12-dodecanediol, bis(hydroxymethyl)cyclohexanes (such as, for example, 1,4-bis(hydroxymethyl) cyclohexane), triethylene glycol, tetraethylene glycol, polyethylene glycols, dipropylene glycol, tripropylene glycol, polypropylene glycols, dibutylene glycol, and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolyzates, cellulose, cellulose hydrolyzates, hydroxy-functionalized fats and oils, especially castor oil), and also all products of modification of these aforementioned alcohols with different amounts of ε-caprolactone. In mixtures of H-functional starters, it is also possible to use trihydric alcohols, for example trimethylolpropane, glycerol, trishydroxyethyl isocyanurate and castor oil.

The H-functional starter compounds can also be selected from the class of polyether polyol, in particular those having a molecular weight $M_n$ in the range from 100 to 4000 g/mol, preferably from 250 to 2000 g/mol. Preference is given to polyether polyols which are made up of repeating ethylene oxide and propylene oxide units, preferably with a proportion of from 35 to 100% of propylene oxide units, particularly preferably with a proportion of from 50 to 100% of propylene oxide units. These may be random copolymers, gradient copolymers, alternating copolymers or block copolymers of ethylene oxide and propylene oxide. Suitable polyether polyols made up of repeating propylene oxide and/or ethylene oxide units are for example, the Desmophen®, Acclaim®, Arcol®, Baycoll®, Bayfill®, Bayflex®, Baygal®, PET® and polyether polyols from Covestro Deutschland AG (for example Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are, for example, the Pluriol® E products from BASF SE, suitable homopolypropylene oxides are, for example, the Pluriol® P products from BASF SE; suitable mixed copolymers of ethylene oxide and propylene oxide are, for example, the Pluronic® PE or Pluriol® RPE products from BASF SE.

The H-functional starter compounds can also be selected from the class of polyester polyols, in particular those having a molecular weight $M_n$ in the range from 200 to 4500 g/mol, preferably from 400 to 2500 g/mol. At least bifunctional polyesters are used as polyester polyols. Polyester polyols preferably consist of alternating acid and alcohol units. Acid components employed are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. Using dihydric or polyhydric polyether polyols as alcohol components gives polyester ether polyols which can likewise serve as starter compounds for preparing the polyether carbonate polyols. If polyether polyols are used for preparing the polyester ether polyols, polyether polyols having a number average molecular weight M of from 150 to 2000 g/mol are preferred.

Furthermore, polycarbonate polyols (for example polycarbonate diols) in particular those having a molecular weight $M_n$ in the range from 150 to 4500 g/mol, preferably from 500 to 2500, as are prepared, for example, by reaction of phosgene, dimethyl carbonate, diethyl carbonate or diphenyl carbonate and bifunctional and/or polyfunctional alcohols or polyester polyols or polyether polyols, can be used as H-functional starter compounds. Examples of polycarbonate polyols may be found in EP-A 1359177 for example. For example, the Desmophen® C grades from Covestro Deutschland AG, e.g. Desmophen® C 1100 or Desmophen® C 2200, can be used as polycarbonate diols. It is likewise possible to use polyether carbonate polyols as H-functional starter compounds. In particular, polyether carbonate polyols prepared by the above-described process are used. These polyether carbonate polyols used as H-functional starter compounds are for this purpose prepared beforehand in a separate reaction step.

Preferred H-functional starter compounds are alcohols of the general formula (VI),

HO—(CH$_2$)$_x$—OH (VI)

where x is from 1 to 20, preferably an even number from 2 to 20. Examples of alcohols of the formula (VI) are ethylene glycol, 1,4-butanediol, 1,6-hexanediol, 1,8-octanediol, 1,10-decanediol and 1,12-dodecanediol. Further preferred H-functional starter compounds are neopentyl glycol, trimethylolpropane, glycerol, pentaerythritol, reaction products of the alcohols of formula (IV) with 8-caprolactone, for example reaction products of trimethylolpropane with 8-caprolactone, reaction products of glycerol with 8-caprolactone and reaction products of pentaerythritol with 8-caprolactone. Preference is also given to using water, diethylene glycol, dipropylene glycol, castor oil, sorbitol and polyether polyols made up of repeating polyalkylene oxide units as H-functional starter compounds.

The H-functional starter compounds are particularly preferably one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, bifunctional and trifunctional polyether polyols, where the polyether polyol is formed from a bi- or tri-H-functional starter compound and propylene oxide or a bi- or tri-H-functional starter compound, propylene oxide and ethylene oxide. The polyether polyols preferably have a number-average molecular weight M in the range from 62 to 4500 g/mol and in particular a number average molecular weight M in the range from 62 to 3000 g/mol, very particularly preferably a molecular weight of from 62 to 1500 g/mol. The polyether polyols preferably have a functionality of from 2 to 3.

In a preferred embodiment of the invention, the polyether carbonate polyol A1 is obtainable by addition of carbon dioxide and alkylene oxides onto H-functional starter compounds using multi-metal cyanide catalysts (DMC catalysts). The preparation of polyether carbonate polyols by addition of alkylene oxides and CO$_2$ onto H-functional starter compounds using DMC catalysts is known, for example, from EP-A 0222453, WO-A 2008/013731 and EP-A 2115032.

DMC catalysts are known in principle from the prior art for homopolymerization of epoxides (see, for example, U.S. Pat. Nos. 3,404,109, 3,829,505, 3,941,849 and 5,158,922). DMC catalysts which are described, for example, in U.S. Pat. No. 5,470,813, EP-A 700 949, EP-A 743 093, EP-A 761 708, WO-A97/40086, WO-A98/16310 and WO-A00/47649 have a very high activity in the homopolymerization of epoxides and make it possible to prepare polyether polyols and/or polyether carbonate polyols at very low catalyst concentrations (25 ppm or less). A typical example is the highly active DMC catalysts described in EP-A 700 949 which in addition to a double metal cyanide compound (e.g., zinc hexacyanocobaltate (III)) and an organic complexing ligand (e.g., t-butanol) contain a polyether having a number-average molecular weight $M_n$ of greater than 500 g/mol.

The DMC catalyst is usually employed in an amount of ≤1 wt %, preferably in an amount of ≤0.5 wt %, particularly preferably in an amount of ≤500 ppm and in particular in an amount of ≤300 ppm, in each case based on the weight of the polyether carbonate polyol.

In a preferred embodiment of the invention, the polyether carbonate polyol A1 has a content of carbonate groups ("units derived from carbon dioxide"), calculated as CO$_2$, of from 2.0 to 30.0% by weight, preferably from 5.0 to 28.0% by weight and particularly preferably from 10.0 to 25.0% by weight.

In a further embodiment of the process of the invention, the polyether carbonate polyol(s) A1 has/have a hydroxyl number of from 20 mg KOH/g to 250 mg KOH/g and is/are obtainable by copolymerization of from 2.0% by weight to 30.0% by weight of carbon dioxide and from 70% by weight to 98% by weight of propylene oxide in the presence of a hydroxy-functional starter molecule, for example trimethylolpropane and/or glycerol and/or propylene glycol and/or sorbitol. The hydroxyl number can be determined in accordance with DIN 53240-1 (June 2013).

In a further embodiment, use is made of a polyether carbonate polyol A1 containing blocks of the formula (II), where the ratio e/f is from 2: 1 to 1:20.

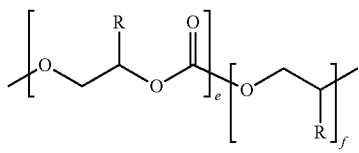

(II)

In a further embodiment of the invention, component A1 is used in an amount of 100 parts by weight.

Component A2

The component A2 comprises polyether polyols having a hydroxyl number in accordance with DIN 53240-1 (June 2013) of from 20 mg KOH/g to 250 mg KOH/g, preferably from 20 to 112 mg KOH/g and particularly preferably from 20 mg KOH/g to 80 mg KOH/g, and is free of carbonate units. The preparation of the compounds A2 can be carried out by catalytic addition of one or more alkylene oxides onto H-functional starter compounds.

As alkylene oxides (epoxides), it is possible to use alkylene oxides having from 2 to 24 carbon atoms. The alkylene oxides having from 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, monoepoxidized or polyepoxidized fats as monoglycerides, diglycerides and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preference is given to using ethylene oxide and/or propylene oxide and/or 1,2-butylene oxide as alkylene oxides. Particular preference is given to using an excess of propylene oxide and/or 1,2-butylene oxide. The alkylene oxides can be introduced individually, in a mixture or in succession into the reaction mixture. The copolymers may be random or block copolymers. If the alkylene oxides are metered in successively, the products (polyether polyols) produced contain polyether chains having block structures.

The H-functional starter compounds have functionalities of from 2 to 6 and are preferably hydroxy-functional (OH-functional). Examples of hydroxy-functional starter compounds are propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea. It is also possible to use these as mixtures. Preference is given to using 1,2-propylene glycol and/or glycerol and/or trimethylolpropane and/or sorbitol as starter compound.

The polyether polyols A2 have a content of from 0 to 60% by weight, preferably from 0 to 40% by weight, particularly preferably from 0 to 25% by weight of ethylene oxide.

Component A3

The component A3 comprises polyether polyols having a hydroxyl number in accordance with DIN 53240-1 (June 2013) of from 20 mg KOH/g to 250 mg KOH/g, preferably from 20 to 112 mg KOH/g and particularly preferably from 20 mg KOH/g to 80 mg KOH/g.

The preparation of the component A3 is in principle carried out in a manner analogous to that of the component A2, but with a content of ethylene oxide in the polyether polyol of >60% by weight, preferably >65% by weight, being set.

Possible alkylene oxides and H-functional starter compounds are the same as those described for component A2.

However, preference is given to H-functional starter compounds which have a functionality of from 3 to 6, particularly preferably 3, so that polyether triols are formed. Preferred H-functional starter compounds having a functionality of 3 are glycerol and/or trimethylolpropane, with particular preference being given to glycerol.

In a preferred embodiment, the component A3 is a glycerol-initiated trifunctional polyether having an ethylene oxide content of from 68 to 73% by weight and an OH number of from 35 to 40 mg KOH/g.

Component A4

The component A4 comprises polymer polyols, PUD polyols and PIPA polyols.

Polymer polyols are polyols which contain proportions of solid polymers produced by free-radical polymerization of suitable monomers such as styrene or acrylonitrile in a base polyol, e.g. a polyether polyol and/or polyether carbonate polyol.

PUD (polyureadispersion) polyols are, for example, prepared by in-situ polymerization of an isocyanate or an isocyanate mixture with a diamine and/or hydrazine in a polyol, preferably a polyether polyol. The polyurea dispersion is preferably prepared by reaction of an isocyanate mixture composed of from 75 to 85% by weight of tolylene 2,4-diisocyanate (2,4-TDI) and from 15 to 25% by weight of tolylene 2,6-diisocyanate (2,6-TDI) with a diamine and/or hydrazine in a polyether polyol, preferably a polyether polyol and/or polyether carbonate polyol prepared by alkoxylation of a trifunctional starter (for example glycerol and/or trimethylolpropane), in the case of the polyether carbonate polyol in the presence of carbon dioxide. Processes for preparing polyurea dispersions are described, for example, in U.S. Pat. Nos. 4,089,835 and 4,260,530.

The PIPA polyols are polyether polyols and/or polyether carbonate polyols modified with alkanolamines, preferably modified with triethanolamine, by polyisocyanate-polyaddition, where the polyether (carbonate) polyol has a functionality of from 2.5 to 4.0 and a hydroxyl number of from 3 mg KOH/g to 112 mg KOH/g (molecular weight from 500 to 18 000 g/mol). The polyether polyol is preferably "EO capped", i.e. the polyether polyol has terminal ethylene oxide groups. PIPA polyols are described in detail in GB 2 072 204 A, DE 31 03 757 A1 and U.S. Pat. No. 4,374,209 A.

Component A5

The component A5 according to the invention comprises polyester polyols containing structural units derived from malonic acid. The polyester polyols of the component A5 can, for example, be polycondensates of an alcohol component and malonic acid.

As alcohol component for the abovementioned polyester polyols, use is made of the diols or polyols known to those skilled in the art. They are preferably selected from the group consisting of ethylene glycol, propylene glycol, butanediol, 2-methyl-1,3-propanediol, 1,5-pentanediol, neopentyl glycol, 1,6-hexanediol, 3-methyl-1,5-pentanediol, 2,3-butanediol, alkoxylates of ethylene glycol and of propylene glycol, e.g. diethylene glycol, triethylene glycol, tetraethylene glycol, dipropylene glycol, tripropylene glycol, and also glycerol, 1,1,1-trimethylolpropane, pentaerythritol, erythrol, castor oil, lesquerella oil, oligomers of butylene glycol and also polyether polyols. Particular preference is given to ethylene glycol, diethylene glycol, triethylene glycol, propylene glycol, dipropylene glycol, butanediol or a mixture of at least two of the compounds mentioned.

It is also possible to use mixtures of the abovementioned alcohol components.

The polyester polyols according to the invention can also be produced by transesterification. For this purpose, low molecular weight esters of malonic acid are reacted with diols or polyols in such a way that the alcohols present in the low molecular weight esters are withdrawn from the reaction mixture and polyester polyols are formed from the malonic acid and the diols or polyols. Low molecular weight esters of malonic acid are, for example, ethyl methyl malonate, diethyl malonate, dipropyl malonate, dibutyl malonate or diisopropyl malonate, with preference being given to using dimethyl malonate or diethyl malonate.

Furthermore, the polyester polyols A5 according to the invention can also be built up by means of a combination of low molecular weight esters, carboxylic acids and diols or polyols, with the structural units derived according to the invention from malonic acid originating from low molecular weight malonic esters, and/or malonic acid being used as carboxylic acid. It is likewise possible to use a mixture of malonic acid and/or low molecular weight malonic esters with polycarboxylic acids, e.g. dicarboxylic, tricarboxylic or even tetracarboxylic acids, or hydroxycarboxylic acids or lactones, with preference being given to using aromatic dicarboxylic acids or mixtures of aromatic and aliphatic dicarboxylic acids. In place of the free polycarboxylic acids, it is also possible to use the corresponding polycarboxylic anhydrides or corresponding polycarboxylic acids of lower alcohols for producing the polyesters.

Possible carboxylic acids are, in particular: oxalic acid, succinic acid, glutaric acid, adipic acid, suberic acid, azelaic acid, sebacic acid, decanedicarboxylic acid, tetrahydrophthalic acid, hexahydrophthalic acid, cyclohexanedicarboxylic acid, tetrachlorophthalic acid, itaconic acid, 2-methylsuccinic acid, 3,3-diethylglutaric acid, 2,2-dimethylsuccinic acid, dodecanedioic acid, endomethylenetetrahydrophthalic acid, dimeric fatty acid, trimeric fatty acid, citric acid, trimellitic acid, benzoic acid, trimellitic acid, maleic acid, fumaric acid, phthalic acid, isophthalic acid and terephthalic acid. It is likewise possible to use derivatives of these carboxylic acids, for example dimethyl terephthalate. The carboxylic acids can be used either individually or in admixture. As carboxylic acids, preference is given to using adipic acid, sebacic acid and/or succinic acid, particularly preferably adipic acid and/or succinic acid.

The polyester polyols A5 according to the invention have, for example, hydroxyl numbers of from 25 to 300 mg KOH/g, preferably from 40 to 150 mg KOH/g, and can have a number average functionality of from 1.0 to 2.5, preferably from 1.2 to 2.2, particularly preferably from 1.9 to 2.1. If the polyester polyols are produced by transesterification from low molecular weight esters, it is likewise possible to use solvents such as benzene, toluene or dioxane in order to drive off the alcohols present in the low molecular weight esters azeotropically from the reaction mixture.

The esterification or transesterification reaction is carried out in a manner known per se by initially charging at least the starting materials bifunctional organic acid or low molecular weight carboxylic ester and bifunctional alcohol and causing these to react by heating.

Possible catalysts are in principle all catalysts known for the preparation of polyesters. These are, for example, tin salts, e.g. tin dichloride or tin diethylhexanoate, titanate, e.g. tetrabutyl titanate, or strong acids, e.g. p-tolulenesulfonic acid, and also organotin compounds, e.g. dibutyltin dilaurate, or salts of bismuth. However, the polyester polyols can also be produced without the use of catalysts.

The above-described polyester polyols containing structural units derived from malonic acid can be used individually or as a mixture.

Component A6

As component A6, it is possible to use all polyhydroxy compounds known to those skilled in the art which do not come under the definition of the components A1 to A5, and preferably have an average OH functionality of >1.5.

These can be, for example, low molecular weight diols (e.g. 1,2-ethanediol, 1,3- or 1,2-propanediol, 1,4-butanediol), triols (e.g. glycerol, trimethylolpropane) and tetraols (e.g. pentaerythritol), polyester polyols not containing any components derived from malonic acid, polythioether polyols or polyacrylate polyols or else polyether polyols or polycarbonate polyols which do not come under the definition of components A1 to A5. It is also possible to use, for example, ethylenediamine- and triethanol-initiated polyethers. These compounds are not counted as compounds according to the definition of component B2.

Component B

As catalysts of the component B1, preference is given to using a) aliphatic tertiary amines (for example trimethylamine, tetramethylbutanediamine, 3-dimethylaminopropylamine, N,N-bis(3-dimethylaminopropyl)-N-isopropanolamine), cycloaliphatic tertiary amines (for example 1,4-diaza[2.2.2]bicyclooctane), aliphatic amino ethers (for example bis(dimethylaminoethyl) ether, 2-(2-dimethylaminoethoxy)ethanol and N,N,N-trimethyl-N-hydroxyethyl(bisaminoethyl ether)), cycloaliphatic amino ethers (for example N-ethylmorpholine), aliphatic amidines, cycloaliphatic amidines, urea and derivatives of urea (for example aminoalkylureas, see, for example, EP-A 0 176 013, in particular (3-dimethylaminopropylamino)urea) and/or b) tin(II) salts of carboxylic acids In particular, the tin(II) salts of carboxylic acids are used, with the parent carboxylic acid in each case having from 2 to 24 carbon atoms. For example, one or more compounds selected from the group consisting of the tin(II) salt of 2-ethylhexanoic acid (i.e. tin(II) 2-ethylhexanoate or tin octoate), the tin(II) salt of 2-butyloctanoic acid, the tin(II) salt of 2-hexyldecanoic acid, the tin(II) salt of neodecanoic acid, the tin(II) salt of isononanoic acid, the tin(II) salt of oleic acid, the tin(II) salt of ricinoleic acid and tin(II) laurate are used as tin(II) salts of carboxylic acids. In a preferred embodiment of the invention, at least one tin(II) salt of the formula (VII)

$$Sn(C_xH_{2x+1}COO)_2 \quad (VII)$$

where x is an integer from 8 to 24, preferably from 10 to 20, particularly preferably from 12 to 18, is used. In formula (VII), the alkyl chain $C_xH_{2x+1}$ of the carboxylate is particularly preferably a branched carbon chain, i.e. $C_xH_{2x+1}$ is an iso-alkyl group.

One or more compounds selected from the group consisting of the tin(II) salt of 2-butyloctanoic acid, i.e. tin(II) 2-butyloctonate, the tin(II) salt of ricinoleic acid, i.e. tin(II) ricinoleate, and the tin(II) salt of 2-hexyldecanoic acid, i.e. tin(II) 2-hexyldecanoate, are most preferably used as tin(II) salts of carboxylic acids.

In another preferred embodiment of the invention, the component B1 used is composed of
- B1.1 from 0.05 to 1.50 parts by weight, based on the sum of the parts by weight of components A1 and A2, of urea and/or derivatives of urea and
- B1.2 from 0.03 to 1.50 parts by weight, based on the sum of the parts by weight of components A1 and A2, of catalysts other than those of the component B1.2, with the content of amine catalysts in the component B1.2 being not more than 50% by weight based on component B1.

Component B1.1 comprises urea and derivatives of urea. Examples of derivatives of urea are: aminoalkylureas, e.g. (3-dimethylaminopropylamine)urea and 1,3-bis[3-(dimethylamino)propyl]urea. It is also possible to use mixtures of urea and urea derivatives. Preference is given to using exclusively urea in component B1.1. The component B1.1 is used in amounts of from 0.05 to 1.50 parts by weight, preferably from 0.10 to 0.50 part by weight, particularly preferably from 0.25 to 0.35 part by weight, based on the sum of the parts by weight of the components A1 to A2.

The component B1.2 is used in amounts of from 0.03 to 1.50 parts by weight, preferably from 0.03 to 0.50 part by weight, particularly preferably from 0.10 to 0.30 part by weight, very particularly preferably from 0.20 to 0.30 part by weight, based on the sum of the parts by weight of the components A1 to A2.

The content of amine catalysts in the component B1.2 is preferably not more than 50% by weight based on component B1.1, particularly preferably not more than 25% by weight based on component B1.1. Component B1.2 is very particularly preferably free of amine catalysts.

The above-described tin(II) salts of carboxylic acids, for example, can be used as catalysts of the component B1.2.

As amine catalysts which may be concomitantly used in small amounts (see above), mention may be made of: aliphatic tertiary amines (for example trimethylamine, tetramethylbutanediamine, 3-dimethylaminopropylamine, N,N-bis(3-dimethylaminopropyl)-N-isopropanolamine), cycloaliphatic tertiary amines (for example 1,4-diaza[2.2.2]bicyclooctane), aliphatic amino ethers (for example bisdimethylaminoethyl ether, 2-(2-dimethylaminoethoxy)ethanol and N,N,N-trimethyl-N-hydroxyethyl(bisaminoethyl ether)), cycloaliphatic amino ethers (for example N-ethylmorpholine), aliphatic amidines and cycloaliphatic amidines.

The "amine catalysts" specified in B1.2 do not include urea or derivatives thereof.

The invention therefore also provides a process for producing polyurethane foams by reaction of the components
A polyol component containing
- A1 from 40 to 100 parts by weight of polyether carbonate polyol having a hydroxyl number in accordance with DIN 53240-1 (June 2013) of from 20 mg KOH/g to 120 mg KOH/g,
- A2 from 0 to 60 parts by weight of polyether polyol having a hydroxyl number in accordance with DIN 53240-1 (June 2013) of from 20 mg KOH/g to 250 mg KOH/g and a content of ethylene oxide of from 0 to 60% by weight, with polyether polyol A2 being free of carbonate units, in nonalkaline medium with
- C water and/or physical blowing agents and
- D diisocyanates and/or polyisocyanates,
- where the production is carried out at an index of from 90 to 120, characterized in that the component A contains a component
- A5 polyester polyol containing structural units derived from malonic acid, and the component A5 is used in an amount of from 0.05 to 10.00 parts by weight, based on the sum of the parts by weight of the components A1+A2=100 parts by weight.

The nonalkaline medium can preferably be achieved by using urea and/or derivatives of urea as catalysts of component B1 and not using any amine catalysts.

The invention therefore preferably provides a process for producing polyurethane foams, characterized in that
A polyol component containing
- A1 from 40 to 100 parts by weight of polyether carbonate polyol having a hydroxyl number in accordance with DIN 53240-1 (June 2013) of from 20 mg KOH/g to 120 mg KOH/g,
- A2 from 0 to 60 parts by weight of polyether polyol having a hydroxyl number in accordance with DIN 53240-1 (June 2013) of from 20 mg KOH/g to 250 mg KOH/g and a content of ethylene oxide of from 0 to 60% by weight, where polyether polyol A2 is free of carbonate units, is reacted
- B1 in the presence of urea and/or derivatives of urea and in the absence of amine catalysts with
- C water and/or physical blowing agents and
- D diisocyanates and/or polyisocyanates, in a nonalkaline medium, where the production is carried out at an index of from 90 to 120, characterized in that the component A contains a component
A5 polyester polyol containing structural units derived from malonic acid,
and the component A5 is used in an amount of from 0.05 to 10.00 parts by weight, based on the sum of the parts by weight of the components A1+A2=100 parts by weight.

As component B2, use is made of auxiliaries and additives such as
a) surface-active additives such as emulsifiers and foam stabilizers, in particular ones having low emission, for example products of the Tegostab® LF2 series,
b) additives such as reaction retarders (e.g. acidic substances such as hydrochloric acid or organic acid halides), cell regulators (for example paraffins or fatty alcohols or dimethylpolysiloxanes), pigments, dyes, flame retardants, further stabilizers against aging and weathering influences, antioxidants, plasticizers, fungistatic and bacteriostatic substances, fillers (for example barium sulfate, kieselguhr, carbonaceous chalk or prepared chalk) and blowing agents.

These auxiliaries and additives which may be concomitantly used are, for example, described in EP-A 0 000 389, pages 18-21. Further examples of auxiliaries and additives which may be concomitantly used according to the invention and details regarding the use and mode of action of these auxiliaries and additives are described in Kunststoff-Handbuch, volume VII, edited by G. Oertel, Carl-Hanser-Verlag, Munich, 3rd edition, 1993, e.g. on pages 104-127.

Component C

Water and/or physical blowing agents are used as component C. As physical blowing agents, use is made of, for example, carbon dioxide and/or volatile organic substances as blowing agents.

Preference is given to using water as component C.

Component D

Suitable diisocyanates and/or polyisocyanates are aliphatic, cycloaliphatic, araliphatic, aromatic and heterocyclic polyisocyanates, as are described, for example, by W. Siefken in Justus Liebigs Annalen der Chemie, 562, pages 75-136, for example those of the formula (IX)

$$Q(NCO)_n, \quad (IX)$$

wherein n is 2-4, preferably 2-3, and

Q is an aliphatic hydrocarbon radical having 2-18, preferably 6-10, carbon atoms, a cycloaliphatic hydrocarbon radical having 4-15, preferably 6-13, carbon atoms or an araliphatic hydrocarbon radical having 8-15, preferably 8-13, carbon atoms.

The polyisocyanates are, for example, polyisocyanates as are described in EP-A 0 007 502, pages 7-8. Preference is generally given to the readily industrially obtainable polyisocyanates, for example tolylene 2,4- and 2,6-diisocyanate and any desired mixtures of these isomers ("TDI"); polyphenylpolymethylene polyisocyanates as prepared by aniline-formaldehyde condensation and subsequent phosgenation ("crude MDI"), and polyisocyanates having carbodiimide groups, urethane groups, allophanate groups, isocyanurate groups, urea groups or biuret groups ("modified polyisocyanates"), especially those modified polyisocyanates which are derived from tolylene 2,4-and/or 2,6-diisocyanate or from diphenylmethane 4,4'- and/or 2,4'-diisocyanate. Preference is given to using one or more compounds selected from the group consisting of tolylene 2,4- and 2,6-diisocyanate, diphenylmethane 4,4'- and 2,4'- and 2,2'-diisocyanate and polyphenylpolymethylene polyisocyanate ("multiring MDI") as polyisocyanate. Particular preference is given to using tolylene 2,4- and/or 2,6-diisocyanate.

In a further embodiment of the process of the invention, the isocyanate component B comprises a tolylene diisocyanate isomer mixture composed of from 55 to 90% by weight of 2,4-TDI and from 10 to 45% by weight of 2,6-TDI.

In a further embodiment of the process of the invention, the isocyanate component D comprises 100% by weight of tolylene 2,4-diisocyanate.

In one embodiment of the process of the invention, the index is from 90 to 120. The index is preferably in the range from 100 to 115, particularly preferably from 102 to 110. The index indicates the percentage ratio of the amount of isocyanate actually used to the stoichiometric amount, i.e. the amount calculated for reaction of the OH equivalents, of isocyanate groups (NCO).

Index=(amount of isocyanate used):(calculated amount of isocyanate)·100 (XII)

To produce the polyurethane foams, the reaction components are reacted by the single-step process known per se, often with the aid of mechanical devices, e.g. those described in EP-A 355 000. Details of processing apparatuses which are also possible according to the invention are described in Kunststoff-Handbuch, volume VII, edited by Vieweg and Höchtlen, Carl-Hanser-Verlag, Munich 1993, e.g. on pages 139 to 265.

The polyurethane foams are preferably in the form of flexible polyurethane foams and may be produced as molded foams or else as slabstock foams, preferably as slabstock foams. The invention therefore provides a process for producing the polyurethane foams, the polyurethane foams produced by these processes, the flexible polyurethane slabstock foams/flexible polyurethane molded foams produced by these processes, the use of the flexible polyurethane foams for production of moldings, and the moldings themselves.

The polyurethane foams, preferably flexible polyurethane foams, obtainable according to the invention are employed, for example, in the following applications: furniture upholstery, textile inserts, mattresses, automobile seats, headrests, armrests, sponges, foam sheets for use in automobile components, for example roof linings, door trim, seat cushions and structural elements.

The flexible foams of the invention have a foam density in accordance with DIN EN ISO 3386-1-98 in the range from 16 to 60 kg/m³, preferably from 20 to 50 kg/m³.

In a first embodiment, the invention provides a process for producing polyurethane foams by reaction of the components A polyol component containing
  A1 from 40 to 100 parts by weight of polyether carbonate polyol having a hydroxyl number in accordance with DIN 53240-1 of June 2013 of from 20 mg KOH/g to 120 mg KOH/g,
  A2 from 0 to 60 parts by weight of polyether polyol having a hydroxyl number in accordance with DIN 53240-1 of June 2013 of from 20 mg KOH/g to 250 mg KOH/g and a content of ethylene oxide of from 0 to 60% by weight, where polyether polyol A2 is free of carbonate units,
B
  B1 catalyst, and
  B2 optionally auxiliaries and additives,
C water and/or physical blowing agents
with
D diisocyanates and/or polyisocyanates,
with the production reaction being carried out at an index of from 90 to 120, characterized in that the component A contains a component
  A5 from 0.05 to 10.00 parts by weight, based on the sum of the parts by weight of the components A1+A2=100 parts by weight, of polyester polyol containing structural units derived from malonic acid.

In a second embodiment, the invention provides a process according to the first embodiment, characterized in that component A has the following composition:
  A1 from 40 to 100 parts by weight of polyether carbonate polyol having a hydroxyl number in accordance with DIN 53240-1 of June 2013 of from 20 mg KOH/g to 120 mg KOH/g,
  A2 from 0 to 60 parts by weight of polyether polyol having a hydroxyl number in accordance with DIN 53240-1 of June 2013 of from 20 mg KOH/g to 250 mg KOH/g and a content of ethylene oxide of from 0 to 60% by weight, with polyether polyol A2 being free of carbonate units, A3 from 0 to 20 parts by weight, based on the sum of the parts by weight of the components A1 and A2, of polyether polyol having a hydroxyl number in accordance with DIN 53240-1 of June 2013 of from 20 mg KOH/g to 250 mg KOH/g and a content of ethylene oxide of >60% by weight, with polyether polyol A3 being free of carbonate units, A4 from 0 to 40 parts by weight, based on the sum of the parts by weight of the components A1 and A2, of polymer polyol, PUD polyol and/or PIPA polyol, A6 from 0 to 40 parts by weight, based on the sum of the parts by weight of the components A1 and A2, of polyol which does not come under the definition of the components A1 to A5, where the parts by weight figures for the components A3, A4 and A6 are each based on the sum of the parts by weight of components A1+A2=100 parts by weight.

In a third embodiment, the invention provides a process according to the first or second embodiment, characterized in that component A is free of components A3 and/or A4.

In a fourth embodiment, the invention provides a process according to any of the embodiments 1 to 3, characterized in that component A comprises:

A1 from 65 to 75 parts by weight of polyether carbonate polyol having a hydroxyl number in accordance with DIN 53240-1 of June 2013 of from 20 mg KOH/g to 120 mg KOH/g, and A2 from 25 to 35 parts by weight of polyether polyol having a hydroxyl number in accordance with DIN 53240-1 of June 2013 of from 20 mg KOH/g to 250 mg KOH/g and a content of ethylene oxide of from 0 to 60% by weight, with polyether polyol A2 being free of carbonate units.

In a fifth embodiment, the invention provides a process according to any of the embodiments 1 to 4, characterized in that component A1 comprises a polyether carbonate polyol which is obtained by copolymerization of carbon dioxide and alkylene oxide in the presence of H-functional starter molecules, with the polyether carbonate polyol preferably having a $CO_2$ content of from 15 to 25% by weight.

In a sixth embodiment, the invention provides a process according to any of the embodiments 1 to 5, characterized in that B1 catalysts selected from one or more of the following compounds
  a) aliphatic tertiary amines, cycloaliphatic tertiary amines, aliphatic amino ethers, cycloaliphatic amino ethers, aliphatic amidines, cycloaliphatic amidines, urea and derivatives of urea and/or
  b) tin(II) salts of carboxylic acids and
B2 optionally auxiliaries and additives
are used as component B.

In a seventh embodiment, the invention provides a process according to any of the embodiments 1 to 5, characterized in that
B1 catalyst and
B2 optionally auxiliaries and additives
are used as component B,
where
B1.1 from 0.05 to 1.50 parts by weight, based on the sum of the parts by weight of the components A1 and A2, of urea and/or derivatives of urea and
B1.2 from 0.03 to 1.50 parts by weight, based on the sum of the parts by weight of the components A1 and A2, of catalyst other than that of the component B1.2, with the content of amine catalyst in the component B1.2 being not more than 50% by weight based on components B1,
are used as component B1.

In an eighth embodiment, the invention provides a process according to any of the embodiments 1 to 7, characterized in that component D comprises 2,4- and/or 2,6-TDI.

In a ninth embodiment, the invention provides a process according to any of embodiments 1 to 8, characterized in that the component A5 has been produced by reaction of malonic acid and/or low molecular weight malonic esters with an alcohol component.

In a tenth embodiment, the invention provides a process according to the ninth embodiment, characterized in that the reaction occurs with at least one diol as alcohol component, with preference being given to ethylene glycol, diethylene glycol, triethylene glycol, propylene glycol, dipropylene glycol, butanediol or a mixture of at least two of the compounds mentioned.

In an eleventh embodiment, the invention provides a process according to any of embodiments 1 to 10, characterized in that the component A5 contains a polyester polyol containing structural units derived from malonic acid and having a hydroxyl number in accordance with DIN 53240-1 of June 2013 of from 25 mg KOH/g to 300 mg KOH/g.

In a twelfth embodiment, the invention provides a process according to any of embodiments 1 to 11, characterized in that component A5 is used in an amount of from 0.5 to 6.0 parts by weight, based on the sum of the parts by weight of the components A1+A2=100 parts by weight.

In a thirteenth embodiment, the invention provides polyurethane foams obtainable by a process according to any of the embodiments 1 to 12.

In a fourteenth embodiment, the invention provides polyurethane foams according to the thirteenth embodiment, wherein the foams are flexible polyurethane foams.

In a fifteenth embodiment, the invention provides for the use of the polyurethane foams according to the thirteenth or fourteenth embodiment for producing furniture upholstery, textile inserts, mattresses, automobile seats, headrests, armrests, sponges, foam sheets for use in automobile components such as roof liners, door trim, seat cushions and components.

Examples

Test Methods

Experimentally determined OH numbers (hydroxyl number) were determined by the method of DIN 53240-1 (June 2013).

Emission Determination—Cyclic Propylene Carbonate
The quantification of the cPC content was carried out by means of $^1$H-NMR spectroscopy (Bruker, DPX 400, 400 MHz): about 24 h after production of the flexible polyurethane foams, a sample of 1.2-1.5 g of the flexible polyurethane foam was Soxhlet extracted in acetone at 60° C. for 7.5 hours. The extract was concentrated under reduced pressure and taken up in deuterated chloroform, with dimethyl terephthalate or 1,2,4-trichlorobenzene as internal standard. The cPC content was subsequently qualified by means of $^1$H-NMR by comparison with the internal standard.

The present invention is illustrated by the following examples, but without being restricted thereto. The symbols have the following meanings:

A1-1: polyether carbonate polyol, functionality 2.8, OH number 54 mg KOH/g, 14% by weight of $CO_2$, prepared by copolymerization of propylene oxide and carbon dioxide using glycerol and propylene glycol as H-functional starter compounds in the presence of a double metal cyanide catalyst A5-1: polyester polyol, functionality 2, OH number 58 mg KOH/g, prepared by reaction of diethyl malonate with a mixture of diethylene glycol (80% by weight) and butanediol (20% by weight)

A5-2: polyester polyol, functionality 2, OH number 55 mg KOH/g, prepared by reaction of diethyl malonate with diethylene glycol A5-3: polyester polyol, functionality 2, OH number 200 mg KOH/g, prepared by reaction of diethyl malonate with diethylene glycol A5-4: polyester polyol, functionality 2, OH number 156 mg KOH/g, prepared by reaction of diethyl malonate with ethylene glycol A6-1: polyester polyol, functionality 2, OH number 62 mg KOH/g, prepared by reaction of adipic acid with diethylene glycol A6-2: polyester polyol, functionality 2, OH number 58 mg KOH/g, prepared by reaction of succinic acid with diethylene glycol B1-1: Niax Catalyst A-1, bis[2-(N,N'-dimethylamino)ethyl]-based (from Momentive Performance Materials GmbH)

B1-2: Desmorapid SO, tin catalyst (from Covestro AG)

B2-1: Tegostab BF 2370 (from Evonik Industries AG)

C-1: water

D-1: Desmodur T 80, mixture of tolylene 2,4'-diisocyanate and tolylene 2,6'-diisocyanate in a ratio of 80/20 (from Covestro AG)

Fyrol-PNX: oligomeric alkyl phosphate (from ICL-IP)

Production of Laboratory Flexible Foams:

The flexible polyurethane foams described in table 1 were produced in a discontinuous process. Mixing of the components was carried out by means of a Pendraulik laboratory mixer model LM 34.

The component A1-1 (125 g) was weighed into a 500 ml paper cup together with the components B1-1, B2-1 and C-1 and premixed for 10 seconds by means of a high-speed stirrer. The component B1-2 was subsequently added and mixing was carried out for 10 seconds at the same stirring speed. Finally, the component D-1 was added to this mixture, mixing was carried out for 7 seconds and the mixture was transferred into a prepared paper box having dimensions of 20 cm×20 cm×15 cm.

The height of the flexible polyurethane foam blocks was about 14-15 cm. The finished flexible polyurethane foam was stored in the paper box for about 20-24 hours before it was sawn into test specimens for testing. The compressive strength and the foam density of the flexible polyurethane foams were determined in accordance with DIN EN ISO 3386-1-98.

When a component A5 was used, this was firstly stirred into the component A1-1 before the remaining formulation components as described above were added.

Production of Laboratory Box Flexible Foams

The flexible polyurethane foams described in table 2 were produced in a discontinuous process. For this purpose, the component A1-1 (2000 g) was weighed together with components B1-1, B2-1 and C-1 into a 5 l bucket and premixed for 20 seconds by means of a high-speed stirrer. The component B1-2 was subsequently added and mixing was carried out for 10 seconds at the same speed. Finally, the component D-1 was added to this mixture, mixing was carried out for a further 7 seconds and the mixture was transferred into a prepared paper box having dimensions of 50 cm×50 cm×50 cm.

The height of the flexible polyurethane foam blocks was about 50-55 cm. The finished flexible polyurethane foam was stored in the paper box for about 20-24 hours before it was sawn into test specimens for testing. The compressive strength and the foam density of the flexible polyurethane foams were determined in accordance with DIN EN ISO 3386-1-98.

When a component A5 was used, this was firstly stirred into the component A1-1 before the remaining formulation components as described above were added.

Results a) Laboratory Flexible Foams (Table 1)

Without component A5, the resulting flexible polyurethane foam displayed a high emission of cyclic propylene carbonate (comparative example 1); this emission can be reduced when a P—O-containing compound is used (comparative example 2). The addition of a polyester without structural units derived from maleic acid (comparative examples 5 and 6) leads to a higher emission of cyclic propylene carbonate than in the case of comparative example 1. Surprisingly, the addition of a component A5, i.e. a polyester polyol containing structural units derived from malonic acid, results in lower values for cyclic propylene carbonate in the emission determination (examples 3 and 4) compared to comparative examples 1, 2, 5 and 6.

b) Laboratory Box Flexible Foams (Table 2)

Without component A5, the resulting flexible polyurethane foam displayed a high emission of cyclic propylene carbonate (comparative example 7), with a higher emission level of cyclic propylene carbonate being found compared to the flexible laboratory foam produced on a smaller scale (comparative example 1). This emission can be reduced when a P—O-containing compound is used (comparative example 8). However, the addition of a component A5 according to the invention surprisingly results throughout in significantly lower values for cyclic propylene carbonate in the emission determination (examples 9 to 11) compared to comparative examples 7 and 8.

TABLE 1

| Flexible laboratory foams | | | | | | | |
|---|---|---|---|---|---|---|---|
| COMPONENT\Example | | 1* | 2* | 3 | 4 | 5* | 6* |
| A1-1 | [parts by weight] | 100 | 100 | 100 | 100 | 100 | 100 |
| B1-1 | [parts by weight] | 0.12 | 0.12 | 0.12 | 0.12 | 0.12 | 0.12 |
| B1-2 | [parts by weight] | 0.18 | 0.18 | 0.18 | 0.18 | 0.18 | 0.18 |
| B2-1 | [parts by weight] | 1.20 | 1.20 | 1.20 | 1.20 | 1.20 | 1.20 |
| C-1 | [parts by weight] | 4.50 | 4.50 | 4.50 | 4.50 | 4.50 | 4.50 |
| Fyrol-PNX | [parts by weight] | — | 1.0 | — | — | — | — |
| A5-1 | [parts by weight] | — | — | 1.0 | — | — | — |
| A5-2 | [parts by weight] | — | — | — | 1.0 | — | — |
| A6-1 | [parts by weight] | — | — | — | — | 1.0 | — |

TABLE 1-continued

Flexible laboratory foams

| COMPONENT\Example | | 1* | 2* | 3 | 4 | 5* | 6* |
|---|---|---|---|---|---|---|---|
| A6-2 | [parts by weight] | — | — | — | — | — | 1.0 |
| D-1 | [parts by weight] | 56.01 | 56.01 | 56.01 | 56.01 | 56.01 | 56.01 |
| Index | | 108 | 108 | 108 | 108 | 108 | 108 |
| Foam density | kg m$^{-3}$ | 27.86 | 26.98 | 24.41 | 25.58 | 25.87 | 25.42 |
| Compressive strength at 40%kPa compression (4th cycle) | | 5.02 | 7.38 | 4.32 | 5.41 | 5.06 | 4.85 |
| Cycl. propylene carbonate | [mg/kg] | 92 | 23 | 9 | 11 | 99 | 131 |

*Comparative example

TABLE 2

Laboratory box flexible foams

| COMPONENT\Example | | 7* | 8* | 9 | 10 | 11 |
|---|---|---|---|---|---|---|
| A1-1 | [parts by weight] | 2000 | 2000 | 2000 | 2000 | 2000 |
| B1-1 | [parts by weight] | 2.4 | 2.4 | 2.4 | 2.4 | 2.4 |
| B1-2 | [parts by weight] | 3.6 | 3.6 | 3.6 | 3.6 | 3.6 |
| B2-2 | [parts by weight] | 24 | 24 | 24 | 24 | 24 |
| C-1 | [parts by weight] | 90 | 90 | 90 | 90 | 90 |
| Fyrol-PNX | [parts by weight] | — | 20 | — | — | — |
| A5-2 | [parts by weight] | — | — | 20 | — | — |
| A5-3 | [parts by weight] | — | — | — | 20 | — |
| A5-4 | [parts by weight] | — | — | — | — | 20 |
| D-1 | [parts by weight] | 1120 | 1120 | 1122 | 1126 | 1136 |
| Index | | 108 | 108 | 108 | 108 | 108 |
| Foam density | kg m$^{-3}$ | 22.8 | 22.8 | 22.5 | 22.2 | 22.0 |
| Compressive strength at 40% compression (4th cycle) | kPa | 4.33 | 4.47 | 3.74 | 4.30 | 4.18 |
| Cycl. propylene carbonate | [mg/kg] | 562 | 251 | 66 | 95 | 75 |

*Comparative example

The invention claimed is:

1. A process for producing polyurethane foams by reaction of the components
   A polyol component comprising
      A1 from 40 to 100 parts by weight of polyether carbonate polyol having a hydroxyl number in accordance with DIN 53240-1 of June 2013 of from 20 mg KOH/g to 120 mg KOH/g,
      A2 from 0 to 60 parts by weight of polyether polyol having a hydroxyl number in accordance with DIN 53240-1 of June 2013 of from 20 mg KOH/g to 250 mg KOH/g and a content of ethylene oxide of from 0 to 60% by weight, with polyether polyol A2 being free of carbonate units,
   B
      B1 catalysts, and
      B2 optionally auxiliaries and additives,
   C water and/or physical blowing agents,
   with
   D diisocyanates and/or polyisocyanates,
   where the production reaction is carried out at an index of from 90 to 120, wherein component A comprises a component
      A5 from 0.05 to 10.00 parts by weight, based on a sum of the parts by weight of the components A1+A2=100 parts by weight, of polyester polyol containing structural units derived from malonic acid.

2. The process as claimed in claim 1, wherein component A has the following composition:
   A1 from 40 to 100 parts by weight of polyether carbonate polyol having a hydroxyl number in accordance with DIN 53240-1 of June 2013 of from 20 mg KOH/g to 120 mg KOH/g,
   A2 from 0 to 60 parts by weight of polyether polyol having a hydroxyl number in accordance with DIN 53240-1 of June 2013 of from 20 mg KOH/g to 250 mg KOH/g and a content of ethylene oxide of from 0 to 60% by weight, with polyether polyol A2 being free of carbonate units,
   A3 from 0 to 20 parts by weight, based on the sum of the parts by weight of the components A1 and A2, of polyether polyol having a hydroxyl number in accordance with DIN 53240-1 of June 2013 of from 20 mg KOH/g to 250 mg KOH/g and a content of ethylene oxide of 60% by weight, with polyether polyol A3 being free of carbonate units,
   A4 from 0 to 40 parts by weight, based on the sum of the parts by weight of the components A1 and A2, of polymer polyol, PUD polyol, PIPA polyol, or a combination thereof, and
   A6 from 0 to 40 parts by weight, based on the sum of the parts by weight of the components A1 and A2, of polyol which is different from components A1 to A5,
   where the parts by weight figures for the components A3, A4 and A6 are in each case based on the sum of the parts by weight of components A1+A2=100 parts by weight.

3. The process as claimed in claim 1, wherein component A is free of components A3 and/or A4.

4. The process as claimed in claim 1, wherein component A comprises:
   A1 from 65 to 75 parts by weight of polyether carbonate polyol having a hydroxyl number in accordance with DIN 53240-1 of June 2013 of from 20 mg KOH/g to 120 mg KOH/g, and
   A2 from 25 to 35 parts by weight of polyether polyol having a hydroxyl number in accordance with DIN 53240-1 of June 2013 of from 20 mg KOH/g to 250 mg KOH/g and a content of ethylene oxide of from 0 to 60% by weight, where polyether polyol A2 is free of carbonate units.

5. The process as claimed in claim 1, wherein component A1 comprises a polyether carbonate polyol obtained by copolymerization of carbon dioxide and alkylene oxide in the presence of H-functional starter molecules, wherein the polyether carbonate polyol has a $CO_2$ content of from 15 to 25% by weight.

6. The process as claimed in claim 1, wherein component B comprises:
   B1 catalyst comprises one or more of the following compounds a) aliphatic tertiary amines, cycloaliphatic tertiary amines, aliphatic amino ethers, cycloaliphatic amino ethers, aliphatic amidines, cycloaliphatic amidines, urea and derivatives of urea, and/or b) tin(II) salts of carboxylic acids, and B2 optionally auxiliaries and additives.

7. The process as claimed in claim 1, wherein component B comprises:

B1 catalysts, and

B2 optionally auxiliaries and additives, wherein component B1 comprises:

B1.1 from 0.05 to 1.50 parts by weight, based on the sum of the parts by weight of the components A1 and A2, of urea and/or derivatives of urea and B1.2 from 0.03 to 1.50 parts by weight, based on the sum of the parts by weight of the components A1 and A2, of catalyst other than those of the components B1.1, with the content of amine catalyst in the component B1.2 being not more than 50% by weight based on components B1.

8. The process as claimed in claim 1, wherein component D comprises 2,4- and/or 2,6-TDI.

9. The process as claimed in claim 1, wherein the component A5 has been prepared by reaction of malonic acid and/or low molecular weight malonic esters with an alcohol component.

10. The process as claimed in claim 9, wherein the reaction is carried out with at least one diol as alcohol component, the diol comprising ethylene glycol, diethylene glycol, triethylene glycol, propylene glycol, dipropylene glycol, butanediol or a mixture of at least two of the compounds mentioned.

11. The process as claimed in claim 1, wherein the component A5 contains a polyester polyol containing structural units derived from malonic acid and having a hydroxyl number in accordance with DIN 53240-1 of June 2013 of from 25 mg KOH/g to 300 mg KOH/g.

12. The process as claimed in claim 1, wherein component A5 is used in an amount of from 0.5 to 6.0 parts by weight, based on the sum of the parts by weight of the components A1+A2=100 parts by weight.

13. A polyurethane foam obtained by a process as claimed in claim 1.

14. The polyurethane foam as claimed in claim 13, wherein the polyurethane foam is a flexible polyurethane foam.

* * * * *